No. 650,067. Patented May 22, 1900.
J. E. NIGHTINGALE.
MACHINE FOR MEASURING SURFACES.
(Application filed Feb. 17, 1900.)

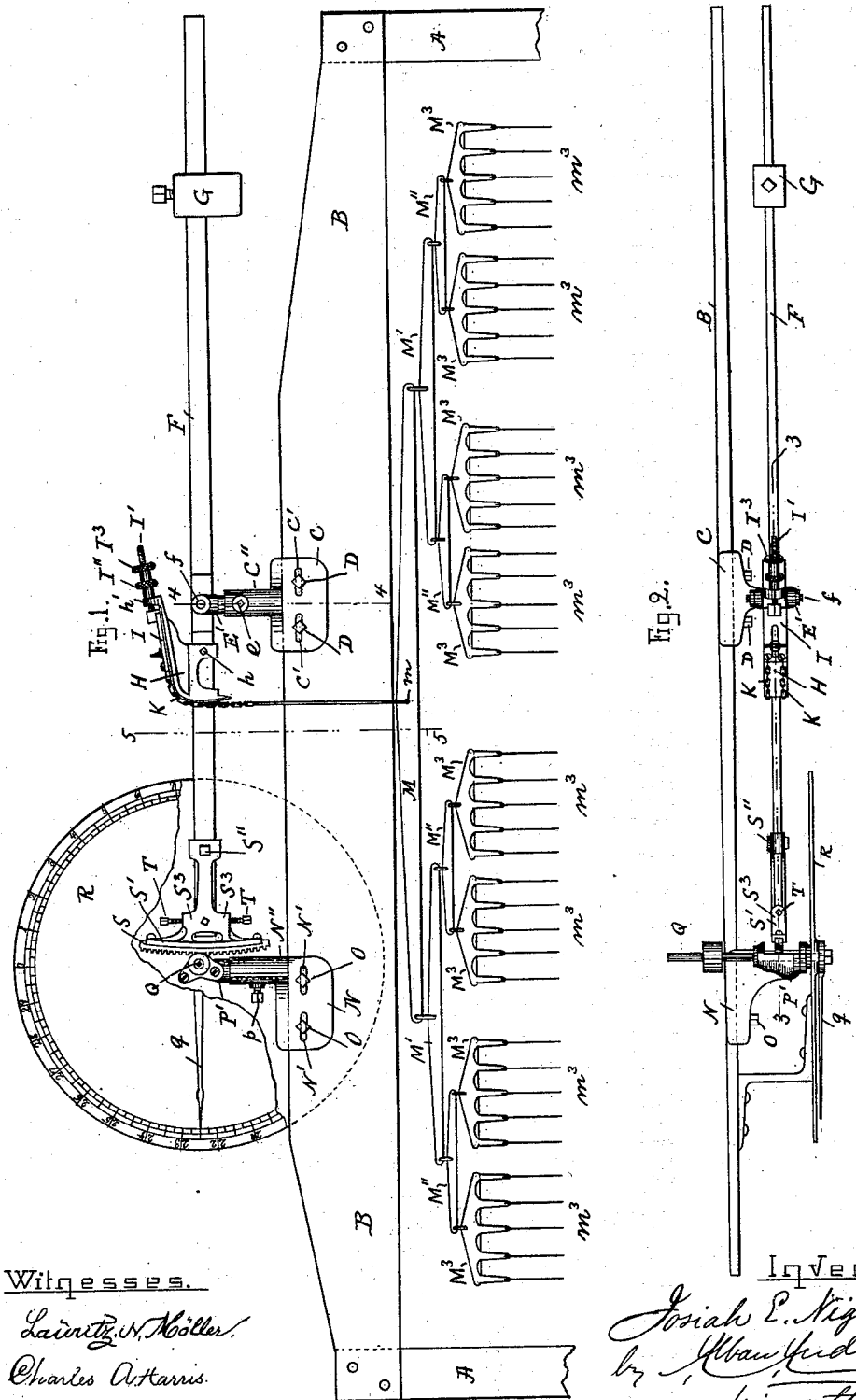

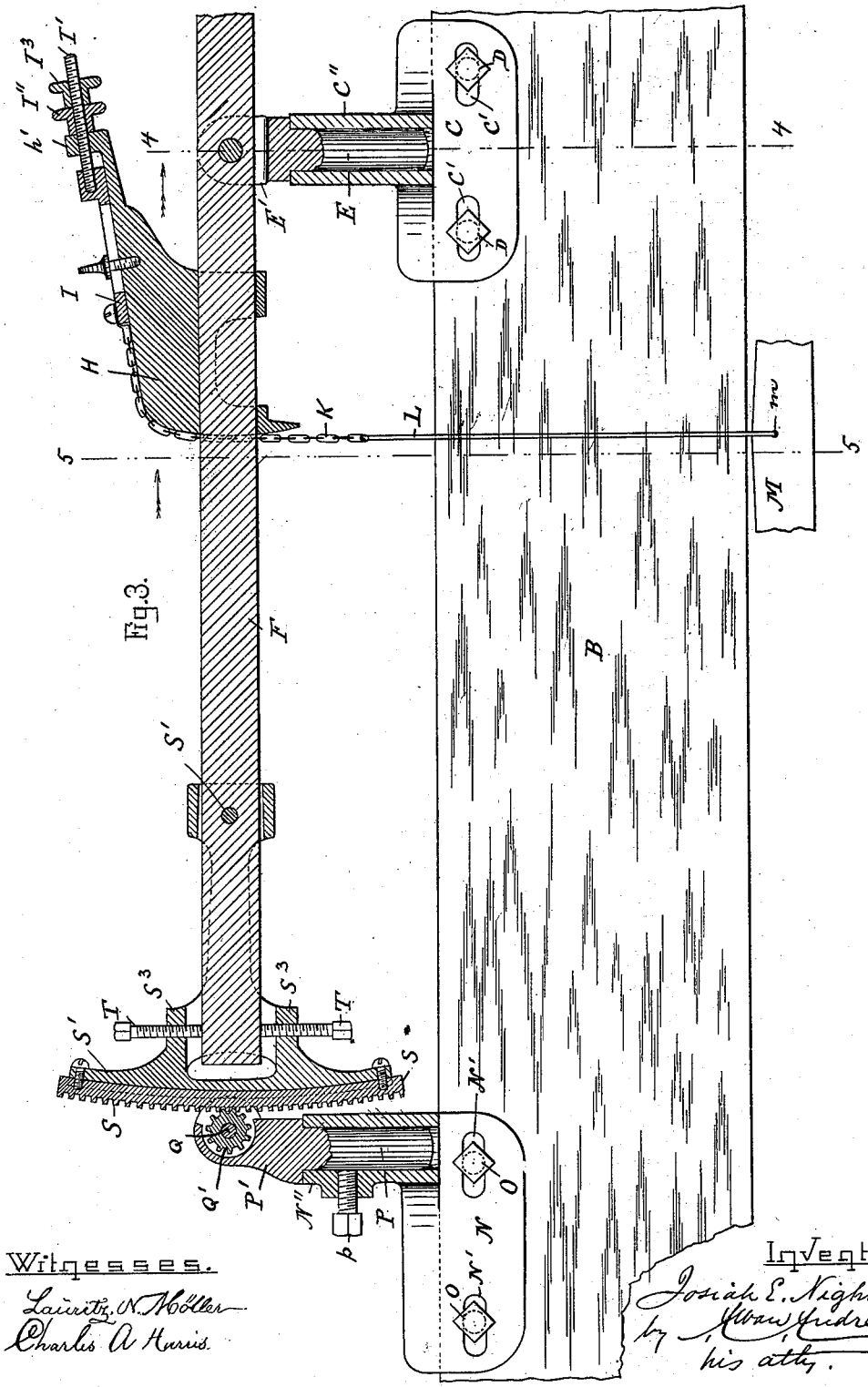

(No Model.) 3 Sheets—Sheet 3.

Witnesses.
Lauritz N. Möller.
Charles A. Harris.

Inventor.
Josiah E. Nightingale
by Alban Andrieu
his atty.

UNITED STATES PATENT OFFICE.

JOSIAH E. NIGHTINGALE, OF DANVERS, MASSACHUSETTS.

MACHINE FOR MEASURING SURFACES.

SPECIFICATION forming part of Letters Patent No. 650,067, dated May 22, 1900.

Application filed February 17, 1900. Serial No. 5,595. (No model.)

*To all whom it may concern:*

Be it known that I, JOSIAH E. NIGHTINGALE, a citizen of the United States, residing at High street, Danvers, in the county of Essex and State of Massachusetts, have invented new and useful Improvements in Machines for Measuring the Areas of Surfaces, of which the following is a specification.

This invention relates to improvements in machines for measuring the areas of surfaces, more especially those of irregular outline, such as hides and skins, and relates particularly to improvements in the indicating device of measuring-machines of the kind shown in the patents granted to William A. Sawyer November 3, 1885, Nos. 329,596 and 329,597, and it is carried out as follows, reference being had to the accompanying drawings, wherein—

Figure 5:
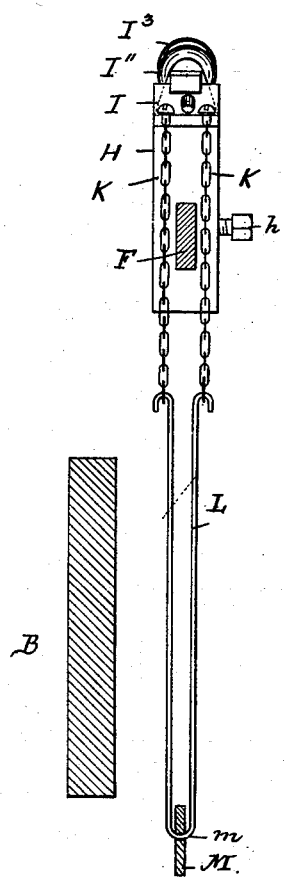
Figure 4:
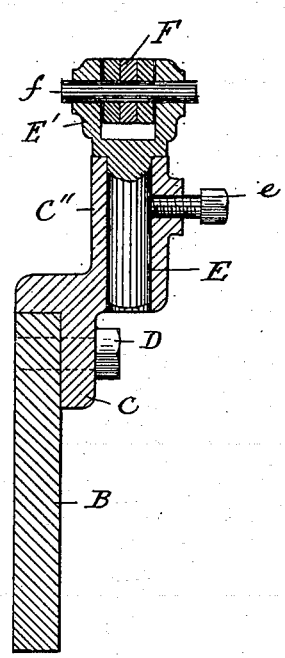

Figure 1 represents a front elevation of my invention, showing the weighted arm or beam connected to the system of levers usually employed in machines of this kind. Fig. 2 represents a top plan view of Fig. 1. Fig. 3 represents a longitudinal section on the line 3 3 shown in Fig. 2. Fig. 4 represents a cross-section on the line 4 4 shown in Figs. 1 and 3; and Fig. 5 represents a cross-section on the line 5 5, also shown in Figs. 1 and 3.

Similar letters refer to similar parts wherever they occur on the different parts of the drawings.

The essential features of my present improvement consist in means for adjusting the bracket in which the pinion and dial-pointer shaft are mounted relative to the rack on the weighted arm or beam, so as to cause said pinion and rack to properly intermesh, also in means for adjusting the position of the rack relative to the said weighted arm or beam and the pinion on the dial-pointer shaft for the purpose of causing the indicating device to measure correctly all variations in the area of the surfaces of the hides or skins, and also in means for adjusting the bracket in which the weighted arm or beam is pivoted relative to the lever-suspension chain, so as to cause the latter to be arranged vertically in a line with and over the point of suspension on the uppermost lever in the system of yielding levers, and thereby to cause the machine to record accurately the areas of the surfaces to be measured.

It will not be necessary to go into the details of the general construction of the machine, as these matters are fully set forth and described in the Sawyer patents above mentioned, on which this application is an improvement.

In Fig. 1, A A represent the uprights of the frame of the machine, to the upper ends of which is secured the cross-bar B, which extends from one end of the machine to the other, as is common in machines of this kind. To said cross-bar is secured a bracket C, which is longitudinally adjustable thereon, preferably by means of set-screws D D going through slotted perforations C' C' in said bracket and screwed into perforations in the said cross-bar, as shown. The upper end of the said bracket C is preferably provided with a vertical cylindrical socket C'', adapted to receive the cylindrical shank E, having an upper forked end E', in which the beam or arm F is pivoted at $f$, as shown. The shank E may be adjusted up or down in the socket C'' or slightly oscillated, so as to cause the beam or arm to be hung properly relative to the pinion on the index-pointer shaft hereinafter to be described. The said shank E after being adjusted within the socket C'' may be secured in such adjusted position, preferably by means of a set-screw $e$, as shown.

G is a balance-weight adjustably secured to one end of the arm or beam F, as usual.

H is a curved metal piece longitudinally adjustable upon the beam F and adapted to be secured thereto after being adjusted by means of a set-screw $h$, as shown.

On the upper portion of the curved metal piece H is located a chain-holding block I, provided with a screw I', passing loosely through an ear $h'$ on the curved piece H and adapted to be adjusted by means of a nut I'' and locked in its adjusted position by means of a suitable check-nut I³, as shown.

To the lower end of the block I are secured the upper ends of the chains K K, one on each side of the beam F, and to the lower ends of said chains is attached a bail or rod L, the lower end of which is pivotally connected at $m$ to the upper lever M in the system of levers usually employed in machines of this kind. The ends of the lever M are pivotally connected to levers M' M', and the ends of the latter are pivotally connected to levers M'' M'', and from the ends of the latter are suspended the levers M³ M³, to which are suitably connected the chains $m^3$ $m^3$, the lower portions of which are suitably connected to the gears or segments for measuring the areas of the surfaces of the hides or skins in a manner similar to that shown in Fig. 2 of the drawings of W. A. Sawyer's patent, No. 286,078, dated October 2, 1883.

By having the bracket C adjustable lengthwise upon the beam F the position of the chain or chains K K and rod L can be adjusted so as to cause such to be arranged perpendicularly above the point of suspension $m$, where the lever M is hung, so as to cause the machine to record the areas most accurately. N is another bracket, adjustably secured upon the beam F and is for this purpose preferably provided with slotted perforations N' N', through which the fastening-screws O O are inserted and afterward screwed or otherwise secured to the said beam F, as shown. The upper portion of said bracket N is provided, preferably, with a cylindrical socket N'', adapted to receive the cylindrical shank P, having an upper forked end P', in which the index-pointer shaft Q is journaled. $p$ is a set-screw by means of which the shank P may be secured within the socket N'' after said shank has been adjusted in the latter, either in a vertical or horizontal plane, as may be desired.

To the shaft Q is secured the pinion Q', as well as the index-pointer $q$, which is made to indicate upon a stationary graduated dial R, as usual. The teeth of the pinion Q' mesh in the teeth of the curved rack S, which is preferably secured in a detachable manner to a segment S', which is pivoted at S'' to the beam F, as shown.

S³ S³ are screw-threaded ears or projections on the segment S', adapted to receive the set-screws T T, by means of which the said segment S' and its rack S may be adjusted on the pivot S'' relative to the pinion Q' for the purpose hereinbefore stated.

In machines of this kind it is very essential that the suspension-rod L and its chain K should be arranged perpendicularly in a line with the point of suspension $m$ to cause the device to record the areas most accurately, and this can easily be accomplished by the adjustment of the bracket C on the beam F, as stated. It is also essential that the teeth of the pinion Q' and rack S should intermesh properly without much frictional resistance, and this is readily accomplished by the adjustment of the bracket N on the beam F, as hereinbefore mentioned.

In machines of this kind it sometimes occurs that the measuring devices will indicate accurately up to about ten or twenty square feet and either indicate too much or too little of such areas, or vice versa, and this may readily be remedied by adjusting the position of the rack S on its pivotal connection with the beam F so as to cause one end or part of the said rack to engage the pinion Q' with more or less frictional resistance as compared with its other end, and this I accomplish by adjusting the positions of the regulating-screws T T, as described.

What I wish to secure by Letters Patent and claim is—

1. In a machine for measuring the areas of surfaces, an indicator device consisting in combination, a cross-bar or stationary support, a beam pivotally connected to said support, a rack pivotally connected to said beam and means for adjusting said rack on its pivotal connection, a pinion meshing in said rack, and having its shaft journaled in a bearing on said support, an index-pointer secured to said shaft, a stationary dial, and a connecting device between said beam and the system of levers comprising part of the measuring device, substantially as and for the purpose set forth.

2. In a machine for measuring the areas of surfaces, an indicator device consisting in combination a cross-bar or stationary support, a beam pivotally connected to a bracket adjustably secured to said support, a connecting device between said beam and the system of levers comprising part of the measuring device, a rack adjustably secured to one end of said beam, a pinion-shaft, journaled in a bracket adjustably secured to said support, and having a pinion intermeshing with said rack, an index-pointer secured to said pinion-shaft and a stationary dial substantially as and for the purpose set forth.

3. In a machine for measuring the areas of surfaces, an indicator device consisting in combination, a cross-bar or stationary support, a bracket C, adjustably secured to said support, a beam pivotally connected to a shank E, adjustably arranged in a recess or socket on said bracket, a connecting device between said beam and the system of levers comprising part of the measuring device, and suitable intermediate connecting mechanism between said beam and the index-pointer substantially as and for the purpose set forth.

4. In a machine for measuring the areas of surfaces, an indicator device, consisting in combination, a cross-bar or stationary support, a beam pivotally connected to a bracket adjustably arranged on said support, a rack adjustably secured to said beam, an index-shaft having a pinion intermeshing with said rack, said index-shaft having secured to it a pinion intermeshing with the rack on the pivoted beam, and a connecting device between the latter and the system of levers comprising part of the measuring device, substantially as and for the purpose set forth.

In testimony whereof I have hereunto set my hand in presence of two subscribing witnesses.

JOSIAH E. NIGHTINGALE.

Witnesses:
ALBAN ANDRÉN,
LAURITZ N. MÖLLER.